United States Patent [19]

Mahoney

[11] Patent Number: 4,471,985
[45] Date of Patent: Sep. 18, 1984

[54] BARBECUE GRILL LIFTING TOOL

[76] Inventor: Patrick E. Mahoney, 730 Sunrise La., Green Bay, Wis. 54301

[21] Appl. No.: 505,403

[22] Filed: Jun. 17, 1983

[51] Int. Cl.³ .............................................. A47J 45/10
[52] U.S. Cl. ......................................... 294/10; 294/2; 294/27 R
[58] Field of Search .................. 294/2, 3, 7, 9, 10, 294/12-14, 15, 27 R, 92; 16/114 R

[56] References Cited

U.S. PATENT DOCUMENTS

| | | | |
|---|---|---|---|
| 465,865 | 12/1891 | Kuhn | 294/12 |
| 554,150 | 2/1896 | Smith | 294/2 |
| 1,587,350 | 6/1926 | Parke | 294/9 |
| 2,613,978 | 10/1952 | Marulli | 294/27 R |
| 2,747,911 | 5/1956 | Kuever | 294/7 |

*Primary Examiner*—Johnny D. Cherry
*Attorney, Agent, or Firm*—James E. Nilles

[57] ABSTRACT

The barbecue grill lifting tool of this invention has a substantially cylindrical rear handle and a front grill engaging element, connected by an elongated rigid stem which disposes the element below and in front of the handle. The grill engaging element has substantial width, with side edges symmetrical to a plane containing the axes of the handle and stem, and it defines top and bottom surfaces normal to the plane and approximately parallel to the handle axis. In the bottom surface is a transverse groove, spaced back from the front edge of the grill engaging element, wherein one rod of a grill is received for stabilization of the grill while an adjacent rod is supportingly engaged by the top surface. The front portion of the element is configured for use as a grill rod scraper.

6 Claims, 7 Drawing Figures

BARBECUE GRILL LIFTING TOOL

FIELD OF THE INVENTION

This invention relates to a tool for lifting a barbecue broiler grill that comprises a plurality of rods connected in substantially parallel relationship, and the invention is more particularly concerned with a tool which can be used for safely lifting such a grill while hot coals remain in place on it, and which can also be used for other purposes in connection with a barbecue broiler.

BACKGROUND OF THE INVENTION

The problem solved by the tool of the present invention is best understood by explaining it in relation to one very popular type of barbecue broiler, although it will be understood that the tool is useful with any type of barbecue broiler that has a grill consisting of parallel rods.

The broiler just referred to comprises a more or less hemispherical bowl and has two circular grills, one of which is of smaller diameter than the other. The smaller grill is received in the bowl, to rest just above its bottom surface, and it provides a support for a bed of charcoal that is burned in the broiler. The larger grill rests on small brackets just below the rim of the bowl, and it supports the food to be cooked, at a level above the burning charcoal.

When fresh charcoal is loaded into the broiler or spent charcoal is removed from it, the larger grill must be lifted out of the way, and since any barbecuing of meat tends to leave a certain amount of charred fat and the like on the upper grill, removal of that grill—even when it is not hot—is preferably accomplished with a tool rather than with the hands. Use of a tool is practically mandatory for removing the lower grill at any time that charcoal on it is burning or likely to be burning.

Heretofore the lifting of barbecue grills has been accomplished with tools that were not well suited to the purpose. Ordinarily a person who cooks with a barbecue broiler has available a long-handled fork or a pancake turner or the like that is used for turning and arranging the food to be cooked, and it was usually this food manipulating tool that was pressed into service for lifting a grill. Unfortunately, such makeshifts could not get a good, stable grip on the grill, and all too often the grill was likely to swing sideward around the tool and drop off of it. Needless to say, such an accident was annoying at best, and if the grill was hot, or carried burning coals, its swinging or falling could be extremely dangerous.

The prior art discloses various tools for handling hot articles. For example, stove lid lifters are disclosed in G. C. Reith U.S. Pat. No. 2,001,286 and W. A. Edington U.S. Pat. No. 2,272,112 but these are not suitable for use with a barbecue grill because the typical stove lid with which they are intended to cooperate is made with a small pocket that receives the tip of the lifter and cooperates with it to provide a stable connection. The prior art also includes a variety of scrapers for cleaning barbecue grills, as for example U.S. Pat. No. 2,824,323 to Tos et al, D. 242,687 to Broberg, Jr., No. 2,747,911 to P. H. Kuerer, No. 4,112,37 to Heuck, and No. 4,282,625 to Hulett. Notwithstanding the attention given to the problem of cleaning a barbecue grill, the more urgent problem of safely lifting such a grill has either escaped attention heretofore or has defied mere skill in the art. Whichever the case, the provision of a tool for that purpose has evidently not been obvious.

SUMMARY OF THE INVENTION

The general object of the present invention is to provide a simple, sturdy and inexpensive tool for lifting a barbecue broiler grill of the type that comprises a plurality of wirelike rods fastened in spaced, parallel relation to one another, whereby a good secure and stable connection with the grill can be quickly and easily made and whereby the grill can be assuredly supported, if desired, in a horizontal and level position such that food or charcoal will not slide off of it.

Another and more specific object of this invention is to provide a barbecue grill lifting tool of the character described that can also be used for performing other functions in connection with a barbecue broiler, and, in particular, can be used as a very efficient scraper for cleaning fat and other food particles off the rods of the grill, a poker or scraper for moving lumps of burning charcoal, or a pusher for adjusting an air valve conventionally present on such a broiler.

Another object of the invention is to provide a tool of the character described that is sturdy, versatile and very attractive in appearance.

In general, these and other objects of the invention that will appear as the description proceeds are achieved in the barbecue grill lifting tool of this invention, which is characterized by a substantially cylindrical rear handle, a rigid front grill engaging element, and an elongated stem extending between and rigidly connecting the handle and the grill engaging element. The grill engaging element, which is preferably of substantial thickness, has opposite top and bottom surfaces, a front edge, and opposite side edges spaced apart by a substantial distance. The stem so disposes the grill engaging element in relation to the handle that said side edges are symmetrically spaced to opposite sides of a plane that contains the axes of the handle and of the stem, and said top and bottom surfaces are in forwardly and downwardly spaced relation to the handle, normal to said plane, and substantially parallel to the axis of the handle. The grill engaging element has a groove in its said bottom surface, spaced behind said front edge and extending substantially transversely to said plane from one to the other of said side edges, wherein a rod of a grill is receivable while said top surface is engaged under an adjacent rod.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
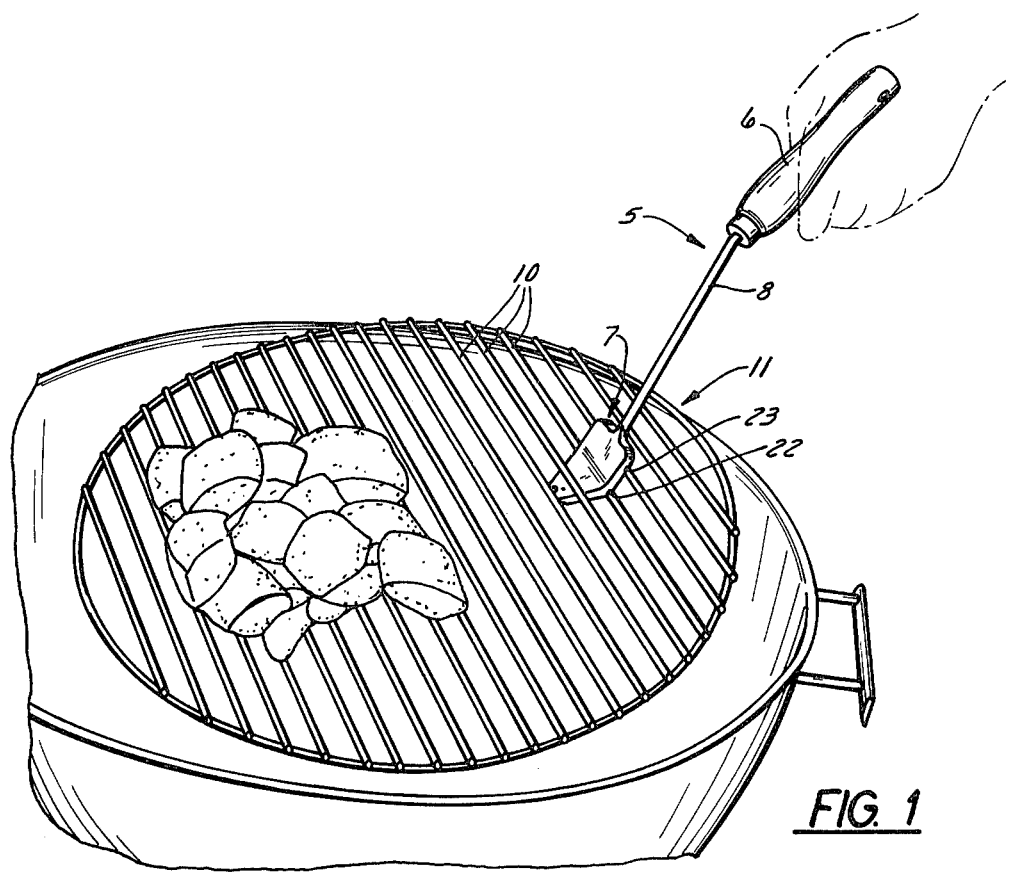
FIG. 1 is a perspective view of the tool of this invention being used to lift the lower grill out of a popular type of barbecue broiler.

The tool 5 of this invention comprises, in general, a rear substantially cylindrical handle 6, a rigid front grill engaging element 7, and an elongated rigid stem 8 that extends between and connects the handle and the grill engaging element.

The stem 8 can comprise a sturdy steel rod. It can be straight along a major portion of its length, between the grill engaging element 7 and the handle 6, but it has a rear portion 9 to which the handle is securely coaxially attached and which extends at a shallow obtuse angle (e.g., 150°) to the remainder of it. Thus, in one position in which the tool is used, the handle 6 is oriented horizontally and the grill engaging element 7 is spaced below and in front of the handle. The handle 6 is preferably of hard wood or similar heat insulating material.

The grill engaging element 7, which can be welded to the front end of the stem 8, should be thick enough to be very sturdy and rigid but thin enough to be readily receivable between the parallel rods 10 of a barbecue grill 11. A thickness of about ¼ in. has been found very satisfactory. For secure engagement with a grill, the grill engaging element should have substantial width (e.g., 1-½ in.), and it should be symmetrical from side to side relative to a plane that contains the axes of the handle 6 and the stem 8.

The grill engaging element 7 has a flat top surface 14 that extends a distance rearwardly from its front edge 15 and has an opposite bottom surface 16. These surface portions 14 and 16 are normal to the plane of symmetry and are approximately parallel to the axis of the handle 6. About midway between its front edge 15 and its rear edge 17 the grill engaging element 7 has a bend or curve 18 which is about equal in magnitude but opposite in direction to the bend that defines the handle attaching portion 9 of the stem 8, and behind this bend 18 the grill engaging element has substantially parallel upper and lower flat surfaces 19 and 20, respectively, which extend obliquely upwardly and rearwardly from the respective top and bottom surfaces 14 and 16 and which are normal to the plane of symmetry and substantially parallel to the major portion of the stem 8.

In its bottom surface 16 the grill engaging element 7 has at least one laterally extending groove 22 that is spaced a substantial distance behind its front edge 15 and is preferably forwardly adjacent to its bend or curve 18. In this case there is also a second downwardly opening groove 23 in the grill engaging element, in its lower surface portion 20, located about midway between the bend 18 and the rear edge 17. Each of the grooves 22, 23 has its length normal to the plane of symmetry and extends all the way from one to the other of the side edges of the grill engaging element, and each groove is of a size to receive one of the rods 10 of a barbecue grill 11 with the rod well seated in the groove. Grooves 22, 23 with a semicircular cross-section of 3/32 in. radius have been found very satisfactory.

For lifting a grill, the tool 5 is manipulated to project the front portion of its grill engaging element 7 substantially straight down between a pair of adjacent rods 10 of the grill and to engage one of those rods in a groove 22 or 23. As can be seen from FIG. 1, the handle 6 is then swung rearward and down to engage the top surface 14 under the other of those two rods so that the grill can be lifted straight up. As it is lifted, the grill tends to maintain itself in a level position because its weight is below the axis of the handle 6 and because the engagement of a rod 10 in a groove 22 or 23 stabilizes the grill against tipping relative to the tool.

To facilitate its insertion between a pair of rods 10, the grill engaging element has a relatively thin front edge 15 and has a lower front bevel surface 26 extending forward and upward to that edge from a small distance behind it.

Figure 2:
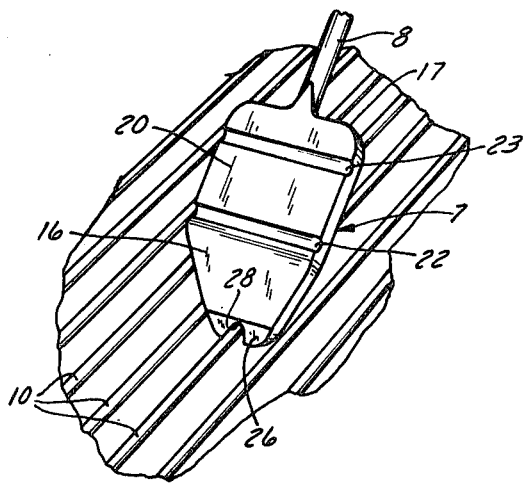
FIG. 2 is a fragmentary perspective view of the tool, showing its employment for scraping the rods of a barbecue grill.

From its rear edge 17 to locations just in front of the bend 18, the side edges 25 of the grill engaging element are preferably straight and parallel, but from those locations forwardly the side edges are convergent, as at 27, to give the grill engaging element a relatively narrow front end. In the front end of the grill engaging element is a forwardly opening slot 28 which has its edges spaced to opposite sides of the plane of symmetry and which is of such width and depth that a grill rod 10 is fairly closely receivable therein. The slot 28 enables use of the tool as a scraper for cleaning grill rods, as illustrated in FIG. 2, and the relatively small width of its front end portion allows it to be effective even when the rods are closely spaced.

Figure 3:
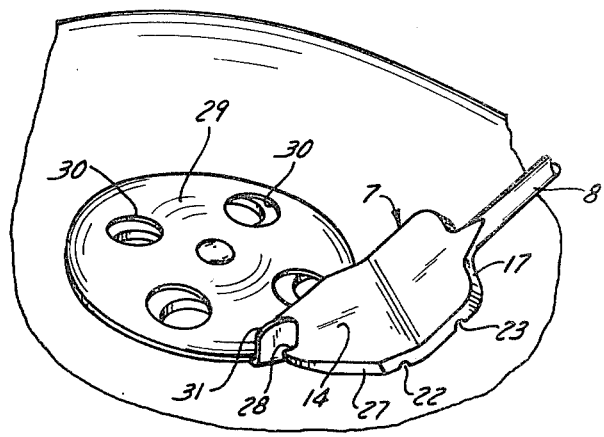
FIG. 3 is another fragmentary perspective view of the tool, showing its use for adjusting a combustion air control valve on the bottom of a barbecue broiler.
Figure 4:
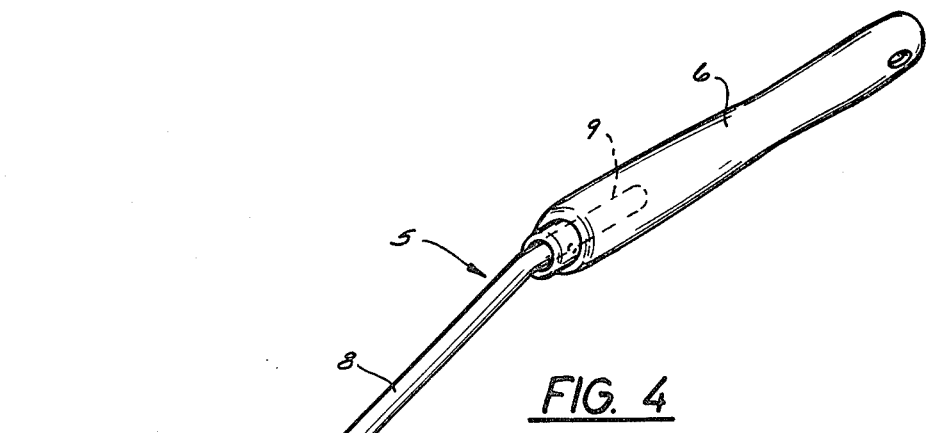
FIG. 4 is a perspective view of the tool per se.
Figure 5:
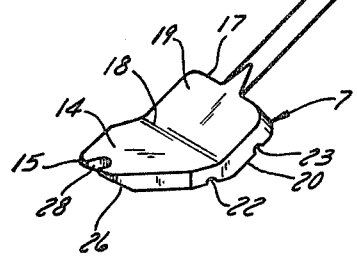
FIGS. 5, 6 and 7 are, respectively, a top view, a side view and a bottom view of the grill engaging element of the tool.
Figure 6:
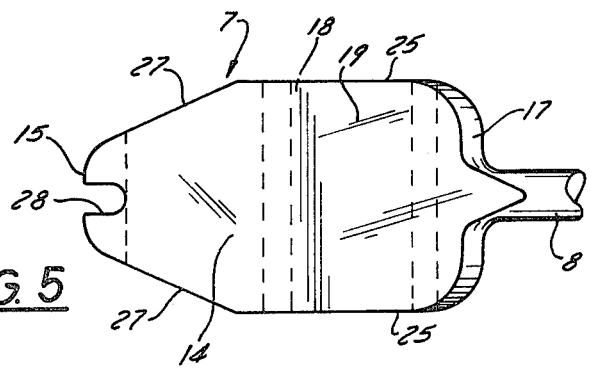
Figure 7:
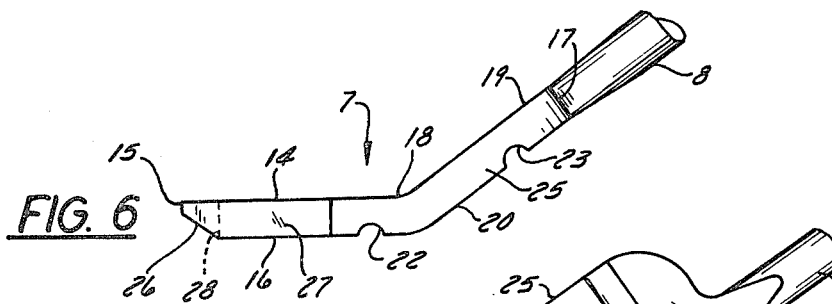

The popular type of barbecue broiler referred to hereinabove has combustion air inlet ports in the bottom of its bowl and has an apertured disc-like valve plate 29 (FIG. 3) which can be rotatably adjusted to bring its apertures 30 into and out of register with the ports for control of combustion air draft. On its edge the plate 29 has a lug 31 that can be engaged for effecting its rotary adjustment, and as FIG. 3 illustrates, the slot 28 in the front end of the tool 5 is nicely adapted for cooperation with this lug 31.

It will be apparent that the tool of this invention also serves as a safe and convenient poker or scraper for moving lumps of glowing charcoal in a broiler.

From the foregoing description taken with the accompanying drawings it will be apparent that this invention provides a tool whereby the grill or grills of a barbecue broiler can be safely and easily lifted, and that the tool of this invention, notwithstanding its simplicity and low cost, also has other important uses in connection with the operation and cleaning of a barbecue broiler.

What is claimed as the invention is:

1. A tool for lifting a barbecue grill that comprises a plurality of rods connected in substantially parallel relationship, said tool being characterized by:
   A. an elongated rear handle;
   B. a rigid front grill engaging element having
      (1) opposite top and bottom surfaces,
      (2) a front edge, and
      (3) opposite side edges spaced apart by a substantial distance;
   C. an elongated stem rigidly connecting said handle with said grill engaging element and disposing the latter
      (1) with its side edges symmetrically spaced to opposite sides of a plane that contains the axes of the handle and of said stem, and
      (2) with said top and bottom surfaces in forwardly and downwardly spaced relation to the handle, normal to said plane and substantially parallel to the axis of the handle; and
   D. said grill engaging element having a groove in its said bottom surface, spaced behind said front edge and extending substantially transversely to said plane from one to the other of said side edges, wherein a rod of a grill is receivable while said top surface is engaged under an adjacent rod.

2. The tool of claim 1, further characterized by said grill engaging element having
   (1) substantially parallel upper and lower surfaces of substantial width that extend obliquely upwardly and rearwardly from said top and bottom surfaces, respectively, and
   (2) a downwardly opening groove in said lower surface that is spaced behind the first mentioned groove and extends lengthwise parallel to it across said lower surface.

3. The tool of claim 1 wherein said grill engaging element is substantially thick along most of its length, further characterized by:
   said grill engaging element being thinnest at its front edge and having a forwardly and upwardly inclined lower bevel surface extending from said bottom surface to said front edge.

4. The tool of claim 1, further characterized by:
   (1) the side edges of the grill engaging element being forwardly convergent between said groove and said front edge so that said element has a narrow front end, and
   (2) said grill engaging element having a slot therethrough, the edges of which are spaced to opposite sides of said plane and in which a grill rod is receivable for scraping.

5. A tool for lifting a barbecue grill that comprises a plurality of rods connected in substantially parallel relationship, characterized by:
   A. said tool being elongated and substantially symmetrical to a plane that is vertical when the tool is in an operative position;
   B. said tool having a rear handle portion which, in said position, extends substantially horizontally rearwardly from the remainder of the tool;
   C. said tool further having a front grill engaging element which, in said position, is forwardly and downwardly offset from said handle portion and which terminates at a front edge, said grill engaging element defining
      (1) a top surface which extends a distance rearwardly from said front edge and which, in said position, is substantially horizontal and
      (2) a bottom surface
         (a) which terminates at side edges spaced substantial distances to opposite sides of said plane and
         (b) wherein there is a downwardly opening groove which is spaced behind said front edge and extends lengthwise transversely to said plane from one to the other of said side edges.

6. The tool of claim 5 wherein said grill engaging element is of substantial width and thickness along most of its length, further characterized by:
   (1) the front portion of said grill engaging element being forwardly tapered to a narrow front end thereof,
   (2) said grill engaging element being thinnest at its front end and having a lower bevel surface that extends rearwardly and downwardly from its front end to said bottom surface, and
   (3) said grill engaging element having a forwardly opening slot in its front end portion, the opposite edges of which are spaced to opposite sides of said plane and in which a grill rod can be received for scraping.

* * * * *